Figure 1:
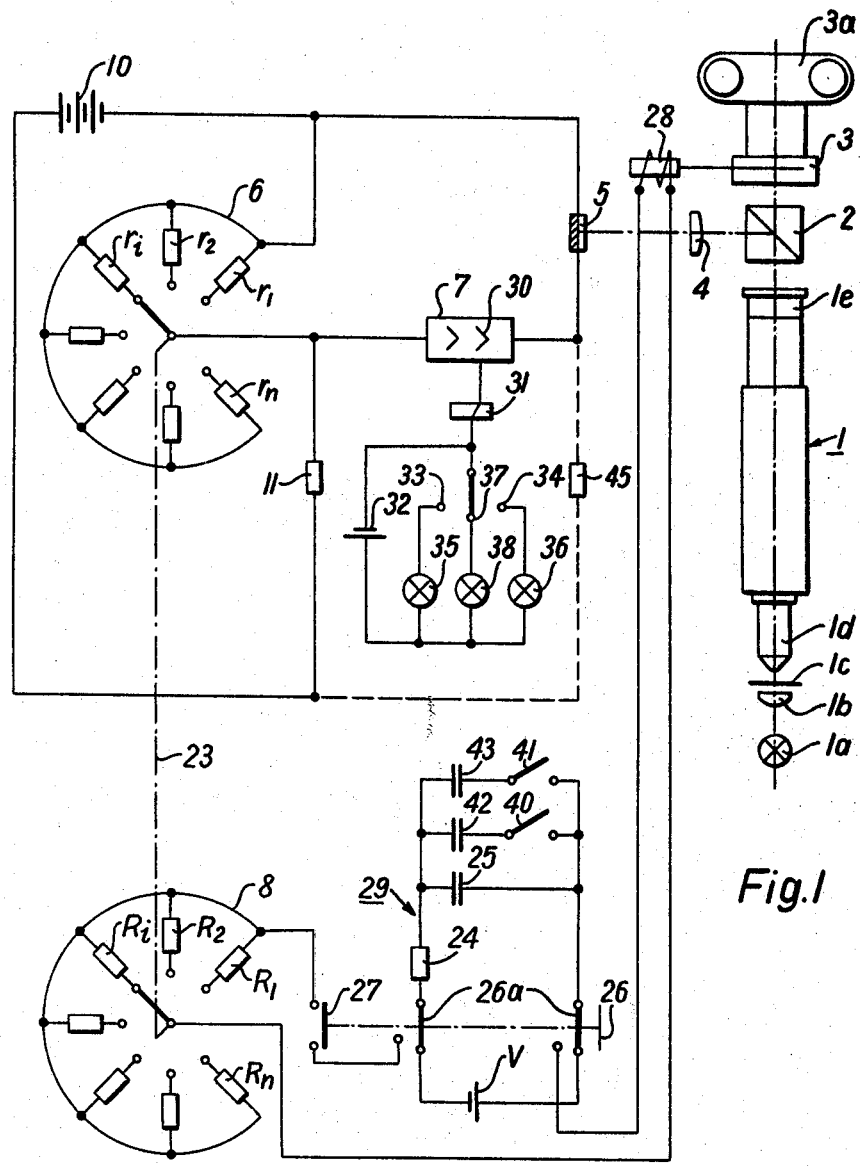

June 4, 1968     K. KROPP     3,386,358

EXPOSURE CONTROL APPARATUS FOR PHOTOMICROGRAPHY

Filed Oct. 13, 1965

INVENTOR

Karl Kropp

BY Michael S. Striker

ATTORNEY 3,386,358
EXPOSURE CONTROL APPARATUS
FOR PHOTOMICROGRAPHY
Karl Kropp, Vienna, Austria, assignor to C. Reichert Optische Werke Aktiengesellschaft, Vienna, Austria
Filed Oct. 13, 1965, Ser. No. 495,621
Claims priority, application Austria, Oct. 14, 1964,
A 8,720/64
5 Claims. (Cl. 95—10)

Photomicrographic apparatus are known in which the exposure time is automatically controlled. These photomicrographic apparatus measure quantities of light. A light-sensitive element receives the luminous flux which comes from a portion of the angular field or from the entire angular field and supplies directly or indirectly a current which is proportional to the integral mean value of the illumination intensity in the angular field and at the beginning of the exposure begins to charge a capacitor. When the voltage across the capacitor reaches a predetermined value, which has been obtained by calibration, an automatic electronic circuit causes the exposure to be terminated.

The automatic exposure control which has been described hereinbefore has proved highly satisfactory in many cases which are not related to photomicrography, for instance, in automatic copying equipment. In the specific case of photomicrography, however, the conditions under which this control can be used without a risk of a false exposure greatly limit its field of application, for the following reasons:

(1) As the automatic control terminates the exposure when a predetermined quantity of light has been received, which depends on the respective sensitized emulsion and is independent of the required exposure time, the quantity of light required for an optimum exposure would have to be constant for all exposure times. In the case of short exposure times, all sensitized emulsions meet this requirement. Considerable differences may sometimes occur, however, in the case of relatively long exposure times, particularly with color films. These differences are covered by the term "Schwarzschild effect" or, more descriptively, "reciprocity law failure." Depending on the sensitized emulsion, they may be considerable even with exposure times of only a few seconds, which are often used in photomicrography.

(2) With the usual color-sensitive emulsions, the color fidelity with which the object is reproduced varies with the exposure time even in the case of an optimum exposure, particularly if the exposure time is relatively long. The reasons for this phenomenon may be summarized by stating that the reciprocity law failure differs between the three components of the color-sensitive emulsion.

(3) With moving specimens of low brightness, such as growing crystals, living cells, etc., the relatively long exposure time obtained by automatic control would result in photographs which are useless because they are unsharp due to movement. The human eye is not capable of estimating the required exposure time in view of the brightness of the microscope image and the automatic control does not indicate the exposure time.

In the cases which have been described, the exposure time cannot be readily corrected. In the first place, an interference with the operation of the automatic control is not possible. In the second place, even if such interference were possible, the most important information required for this interference would not be available because the exposure time determined by the automatic control cannot be stated beforehand.

It is an object of the present invention to eliminate these disadvantages and provide an apparatus which is useful for photomicrography and intially measures and indicates the exposure time and then effects an automatic control of the exposure with any correction which may be required in each specific case.

Such an apparatus comprises an electromagnetic shutter, which is opened and closed by an electric timer, which contains a resistance-capacitance arrangement and controls the exposure time and which is capable of controlling $n$ exposure times graded according to a geometric series, and a light detector, which is disposed in the path of rays and has an illumination intensity which is proportional to that on the sensitized layer. The apparatus is characterized in that a compensating circuit is provided, which includes an auxiliary voltage source, the light detector and $n$ compensating resistors $r_i$, where $i=1$ to $n$, which are set so that the $i$th compensating resistor compensates the current which flows through the light detector so that a zero signal is indicated, and that the timer includes a resistance-capacitance arrangement which is adjustable in $n$ time constant steps $(RC)_i$, where $i=1$ to $n$, and is coupled by known mechanical means to the compensating resistors $r_i$ in such a manner that the connection of the $i$th compensating resistor into the circuit to provide a zero signal results in the timer in a synchronous adjustment of the resistance-capacitance arrangement to the $i$th step, which has been determined by calibration so that the timer controls an exposure time which results in the correct exposure time when the illumination intensity on the sensitized layer corresponds to the $i$th stage.

If one compensating resistor after the other is included in the circuit, the appearance of the zero signal will indicate that the correct exposure time has been set. Owing to the abovementioned calibration, this exposure time can be read from the rotary switch. According to the Austrian patent specification No. 223,391, the signal to be reduced to zero may be used for an automatic control of the connection of the compensating resistors into the circuit until the signal has disappeared. For the purposes of the invention it is suitable to effect a synchronous control of the connection of the compensating resistors $r_i$ into the circuit and of the adjustment of the resistance-capacitance arrangement to the respective stage $(RC)_i$ with two separate rotary switches, which are coupled by a common shaft.

The invention teaches also to vary the coupling between the compensating resistors and the timer in consideration of constant factors which affect the proper exposure time, preferably of the sensitivity of the sensitized layer.

The invention teaches also to vary the resistors and/or capacitors of the timer which control the time constant thereof in order to take influences, particularly the reciprocity law failure, which prolong the required exposure time, into account.

It is not significant what known element is used as a light detector. This may consist, e.g., of a barrier layer cell, a photoelectric cell, a photomultiplier or a photoconductor. In the latter case, the compensating network consists simply of a bridge network.

Figure 2:
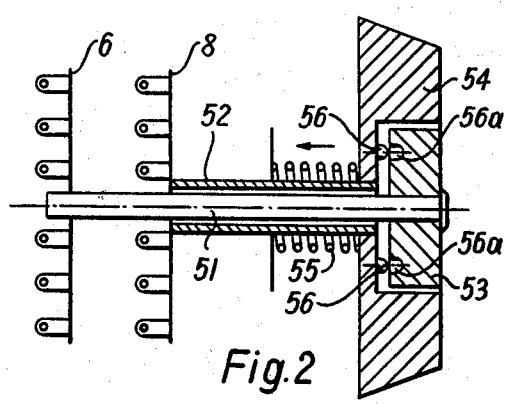

An illustrative embodiment of the invention is diagrammatically shown in FIGS. 1 and 2 of the accompanying drawing.

A microscope 1 comprises a light source 1a, a condenser 1b, the specimen 1c, the object lens 1d and the eyepiece 1e. The path of rays is divided behind this microscope by a semitransparent prism 2. One part of the light passes through an electromagnetic shutter 3 to a camera 3a. The other part falls through an auxiliary optical system 4 on a light detector, which consists of a barrier layer cell 5 and is connected in series with an auxiliary voltage source 10, a fixed resistor 11 and an indicator 7. The barrier layer cell 5 is shunted by one of the twenty compensating resistors $r_1$, $r_2$ etc., all of which are arranged in a common plane in the rotary switch 6. This switch is used to contact that compensating resistor $r_i$ into the circuit which compensates the current supplied by the barrier layer cell 5 when the same is subjected to a given illumination intensity.

The indicator 7 contains an amplifier 30, which operates a polarized relay 31. Depending on the direction of current flow in the indicator, the relay 31 connects a battery 32 to one of contacts 33 and 34. In the former case, a red lamp 35 is energized to emit a signal "insufficient." In the second case, another lamp 36 is energized, which emits a signal "excessive." Only if the current flowing through the indicator is reduced substantially to zero because the correct compensating resistor $r_1$ has been connected into the circuit is the relay in its zero position and energizes the green lamp 38 through contact 37. The switching differential of relay 31 corresponds to the current change between adjacent resistors $r_i$.

The rotary switch 6 and a second rotary switch 8 are mounted on a shaft 23. Switch 8 controls the connection of a resistance-capacitance arrangement, which forms part of a timer 29 and is adjustable in twenty time constant steps. This timer has the following mode of operation: In condition of rest, an operating voltage source V charges through a charging resistor 24 a capacitor 25. When the push button 26 is depressed, the capacitor 25 and the resistor then combined with the capacitor 25 in a resistance-capacitance element by the rotary switch 8 are connected through contacts 26a with the coil 28 of the electromagnetic shutter 3, which is thus opened to begin the exposure. The capacitor 25 is discharged through the resistor of the resistance-capacitance arrangement. The switch 27 forms a holding contact for the electromagnet. When the discharge current has dropped below a predetermined value, the electromagnet drops off, the contact 27 is opened, the shutter is closed and the capacitor 25 is again charged by the voltage source V through contacts 26a in preparation of the next exposure. The various resistors $R_i$ of the RC combination which are connected in circuit in synchronism with the compensating resistors $r_1$ are dimensioned by calibration so that the timer controls the magnetic shutter to provide for an exposure time which results in a correct exposure of the sensitized layer in the case of a predetermined illumination intensity.

The mode of operation of the automatic exposure control described hereinbefore by way of example is as follows: The amplifier will generally generate a signal which causes one of the red warning lamps 35 or 36 to be energized. This indicates that the exposure time setting is wrong. The shaft 23 with the switches 6 and 8 must now be rotated until the red warning lamp is extinguished and the green lamp indicates the zero signal. The exposure time can now be read and the automatically controlled exposure can be initiated by depressing the push button 26. If it is required or desirable, correcting factors to take, for instance, the reciprocity law failure into account, may be introduced by an operation of the switches 40 and 41 to connect auxiliary capacitors 42 and 43 in parallel.

The timer may be different from the simple device described hereinbefore and may be controlled, e.g., by cold cathode tubes (see, e.g., Austrian patent specification No. 210,740) and the like.

The functions of R and C which are symmetrically effective in the time-determining term RC may be interchanged by replacing the capacitors 25, 42 and 43 in FIG. 1 by resistors and the resistors $R_1$ to $R_n$ associated with the rotary switch 8 by capacitors.

The control action does not depend on the use of barrier layer cells as light detectors. These may alternatively consist of photomultipliers or photoelectric cells. If the barrier layer cell 5 is replaced by a photoconductor, a resistor 45 is included to form a bridge network, in which the resistors $R_n$ effect a direct compensation of the change of the resistance of the photoconductor.

The sensitivity of the sensitized layer may be taken into account by a change of the coupling between rotary switches 6 and 8 (see FIG. 2). This coupling may be effected, e.g., as follows: The shaft 51 of the switch 6 carries a knob 53, which is provided with a sensitivity scale. The same shaft carries the switch 8, which is mounted on a hollow shaft 52, on which a knob 54 is mounted, which is provided with an exposure time scale. Upon a normal operation of knob 54, a spring 55 urges the knob 54 against 53 so that pins 56 provided in the knob 54 extend into registering openings 56a of knob 53 so that both knobs and both switches are coupled. When the knob 54 is pressed in the direction indicated by the arrow against the spring pressure, this coupling is disengaged and can be re-engaged after a rotation in the desired direction.

I wish to be understood that I do not desire to be limited to the exact details of apparatus shown and described, for obvious modifications will occur to a person skilled in the art.

Having thus described the invention, what I claim as new and desire to be secured by Letters Patent, is as follows:

1. An apparatus for measuring and automatically controlling the exposure time for photomicrography, comprising an electromagnetic shutter, which is opened and closed by an electric timer, which contains a resistance-capacitance arrangement and determines the exposure time and permits of a control of $n$ exposure times graded according to a geometric series, and a light detector, which is included in the path of rays and is exposed to an illumination intensity which is proportional to that which would fall on the sensitized layer, characterized in that a compensating circuit is provided, which includes $n$ compensating resistors $r_i$, where $i=1$ to $n$, an auxiliary voltage source, and the light detector, said compensating resistors are so dimensioned that the $i$th compensating resistor compensates the current flowing through the light detector so that a zero signal is indicated, the timer includes a resistance-capacitance arrangement which is adjustable in $n$ time constant steps $n(RC)_i$, where $i=1$ to $n$, and said resistance-capacitance arrangement is coupled by known means to the compensating resistors $r_i$ in such a manner that the connection of the $i$th compensating resistor, into the circuit so as to obtain a zero signal results in the timer in a synchronous adjustment of the resistance-capacitance arrangement to the $i$th step, which has been determined by calibration so that the timer controls an exposure time which results in a correct exposure when the illumination intensity of the sensitized layer corresponds to the $i$th stage.

2. Apparatus for exposure control as claimed in claim 1, characterized in that the connection of the compensating resistors $r_i$ into the circuit and the adjustment of the resistance-capacitance arrangement to the respective step $(RC)_i$ are synchronously effected by rotary switches, which are coupled by a common shaft.

3. Apparatus for exposure control as claimed in claim 1, characterized in that the coupling between the compensating resistors and the timer can be varied to take constant factors into account which vary the exposure time, preferably the sensitivity of the sensitized layer.

4. Apparatus for exposure control as claimed in claim 1, characterized in that the resistors and capacitors which control the time constant of the timer are variable to take factors, particularly the reciprocity law failure, into account which prolong the required exposure time.

5. Apparatus for exposure control as claimed in claim 1, characterized in that the light detector is formed by a photoconductor.

References Cited

UNITED STATES PATENTS

| | | | |
|---|---|---|---|
| 2,179,717 | 11/1939 | Fedotoff | 95—10 |
| 3,000,281 | 9/1961 | Rentschler | 95—10 |
| 3,205,803 | 9/1965 | Burgarella et al. | 95—10 |

NORTON ANSHER, *Primary Examiner.*
R. A. SCHROEDER, *Assistant Examiner.*